United States Patent

Krauch et al.

[15] 3,640,753
[45] Feb. 8, 1972

[54] MANUFACTURE OF POROMERIC MATERIALS

[72] Inventors: Carl Heinrich Krauch, Heidelberg; Axel Sanner, Ludwigshafen, both of Germany

[73] Assignee: Badische Anilin & Soda-Fabrik Aktiengesellschaft, Ludwigshafen/Rhine, Germany

[22] Filed: Oct. 31, 1969

[21] Appl. No.: 873,117

[30] Foreign Application Priority Data

Nov. 2, 1968 Germany .................. P 18 06 652.9

[52] U.S. Cl. .................. 117/62.2, 117/119.2, 117/135.5, 117/138.8 E, 117/138.8 F, 117/138.8 N, 117/145
[51] Int. Cl. .................. B44d 1/44, D06n 3/04
[58] Field of Search .................. 117/62.2, 63, 138.8 E, 119.2; 260/2.5 L, 2.5 M; 264/41, 48

[56] References Cited

UNITED STATES PATENTS

| 3,428,584 | 2/1969 | Riley | 264/41 |
| 3,208,875 | 9/1965 | Holden | 117/63 |
| 3,527,653 | 9/1970 | Sommer et al. | 117/62.2 |
| 3,492,154 | 1/1970 | Einstman | 117/63 |

FOREIGN PATENTS OR APPLICATIONS

| 1,102,342 | 2/1968 | Great Britain | 117/63 |

Primary Examiner—William D. Martin
Assistant Examiner—M. Sofocleous
Attorney—Johnston, Root, O'Keeffe, Keil, Thompson & Shurtleff

[57] ABSTRACT

The process of making poromeric materials which comprises impregnating webs of fibrous material with aqueous liquids containing olefinically unsaturated monomers which can be polymerized using redox catalysts, and, if desired, high polymeric plastics in dissolved, emulsified or dispersed form, freezing the webs of fibrous materials impregnated with the aqueous liquids, polymerizing the monomers using redox catalysts and thawing out and separating out the water and any residual monomer from the resulting poromeric materials. These poromeric materials are suitable as floor coverings, insulating materials, leather substitutes and coating materials.

9 Claims, No Drawings

MANUFACTURE OF POROMERIC MATERIALS

This invention relates to a process for the production of poromeric materials, in which olefinically unsaturated monomers are polymerized in liquids which have undergone partial or complete crystalline solidification and in the presence of webs of fibrous material.

It is known that olefinically unsaturated monomers in the form of solutions or emulsions in liquids may be polymerized by adding small quantities of redox catalysts, it being possible, in general, to use relatively low temperatures. It is also known that olefinically unsaturated monomers in crystalline form can be polymerized in bulk. Moreover, it is known to polymerize monoolefinically unsaturated monomers, such as acrylonitrile, acrylamide and N-vinylpyrrolidone, in solidified amorphous solutions, e.g., in castor oil. In these conventional processes, some of which are described in "Actions Chimiques et Biologiques des Radiations," Dixième Série, 378/67, Masson & i.e., Editeurs, Paris, 1966, Chapter IV, conventional polymers are obtained usually in the form of powders or gels. An exception is the polymerization of pure methacrylic acid crystals by ultraviolet radiation in which a small portion of fiberlike polymer is formed in addition to amorphous polymer within one and the same crystal (cf. C. H. Bamford, A. D. Jenkins and J. C. Ward, J. Polymer Sci. 37, 48 (1966)). However, the fiberlike polymers are packed closely together with no spaces between the fibers.

Furthermore it is known from British Pat. No. 1,102,342 to impregnate nonwovens with aqueous polymer dispersions and then to cool the impregnated nonwoven fabrics down to a temperature at which the aqueous polymer dispersions freeze. In this process the polymer dispersion solidifies with the formation of fiberlike agglomerations of the polymer.

The object of the invention is to provide a process for the production of poromeric materials by direct polymerization of olefinically unsaturated monomers. Other objects of the invention will become obvious as the description proceeds.

We have now found that these objects are achieved and the production of poromeric materials can be carried out by impregnating webs of fibrous material with aqueous liquids containing A. polyolefinically unsaturated monomers which can be be polymerized with redox catalysts, or
B. polyolefinically and monoolefinically unsaturated monomers which can be polymerized with redox catalysts, or
C. polyolefinically unsaturated monomers which can be polymerized with redox catalysts, and high polymeric plastics dispersible or soluble in water, or
C. polyolefinically and monoolefinically unsaturated monomers which can be polymerized with redox catalysts, and high polymeric plastics dispersible or soluble in water, or
E. monoolefinically unsaturated monomers which can be polymerized with redox catalysts, and high polymeric plastics dispersible or soluble in water, in dissolved, emulsified or dispersed form, cooling the webs of fibrous material impregnated with the aqueous liquids to temperatures at which the liquids undergo at least partial solidification, polymerizing the unsaturated monomers using redox catalysts, at least one component of which is not added until after complete or partial crystalline solidification of the liquids, thawing out and removing the water and any residual unsaturated monomer from the resulting poromeric materials.

Suitable monoolefinically unsaturated monomers are those which can be polymerized using redox catalysts, and this may be readily determined by simple preliminary experiment.

Particularly suitable monoolefinically unsaturated monomers for the process of the invention are acrylic and methacrylic esters of alkanols having one to eight, particularly one to four, carbon atoms; acrylic and/or methacrylic esters of cycloalkanols having five or six carbon atoms in the ring or of polyhydric, in particular dihydric or trihydric, alcohols having two to six carbon atoms; acrylic and/or methacrylic amides or their N-methylol compounds or their N-methylol ethers of alcohols having one to four carbon atoms. Examples of such particularly suitable monomers are the methyl, ethyl, n-propyl, n-butyl, isobutyl, n-hexyl, cyclohexyl and 2-ethylhexyl esters of acrylic and methacrylic acids, 2-hydroxyethyl acrylate, 1,4-butanediol monoacrylate, 3-chloro-2-hydroxypropyl acrylate, acrylamide, methacrylamide, N-methylolacrylamide, N-methylolmethacrylamide, N-methylolacrylamide methyl ether and N-methylolmethacrylamide n-butyl ether. Mixtures of said monomers may also be used with advantage. It may be advantageous to replace up to 25 percent by weight of the monomers by acrylic or methacrylic acid. If hard, stiff products are desired, then up to 50 percent of the monomers may be replaced by acrylic or methacrylic acid.

Examples of monoolefinically unsaturated monomers which are also suitable, particularly in admixture with the monomers mentioned above, are vinyl esters of aliphatic carboxylic acids having two to 18 carbon atoms, such as vinyl acetate, vinyl propionate, vinyl n-butyrate, vinyl laurate and vinyl stearate; vinyl ethers of alcohols having four to eight carbon atoms, such as vinyl isobutyl ether and vinyl n-octyl ether; N-vinyl compounds, such as N-vinyl caprolactam and N-vinyl ethyl carbamate; vinyl chloride and vinylidine chloride; vinyl-aromatic compounds having eight or nine carbon atoms, such as styrene or vinyltoluene; and vinyl thioethers, such as 2-vinyl thioethanol.

In the process according to the invention the olefinically unsaturated monomers may also be substances which contain chromophoric groups in addition to polymerizable double bonds. Suitable "colored monomers" of this kind are for example dyes of the azo, anthraquinone or diaryl methane series which have a polymerizable C—C double bond. Such dyes are described for example in British Pat. Nos. 830,876, 875,946, 914,354 and 858,183; French Pat. No. 1,118,705 and Belgian Pat. Nos. 566,099 and 590,317. As examples there may be mentioned the coupling products of diazotized 1-amino-3-acryloylaminobenzene with 1-(N-($\beta$-hydroxyethyl)-N-($\beta$-cyanoethyl)-amino)-3-methylbenzene or of diazotized 1-acryloylamino-4-aminobenzene with 1-hydroxy-naphthalene-4-sulfonic acid or of acryloylaminoazobenzene with 1-amino-2-acetyl-4-acryloylaminoanthraquinone. The amount of such "colored monomers" is generally from 0.01 to 10 percent, preferably from 0.5 to 5 percent, by weight based on the total weight of the monomers.

In the production of copolymers from the monomers having only one polymerizable double bond and monomers having at least two olefinically unsaturated double bonds, the proportions of the two types of monomer may be varied within wide limits, but the mixture should contain at least 0.01 percent, particularly at least 0.5 percent, by weight of monomers having at least two double bonds, based on the total weight of the monomers. The amount of monomers having at least two polymerizable double bonds is preferably between 5 percent and 100 percent by weight, based on the total monomer content.

Suitable polyolefinically unsaturated monomers are those which can be polymerized with redox catalysts; this may be easily ascertained by preliminary experiment.

Examples of suitable polyolefinically unsaturated monomers are polyolefinically unsaturated carboxylic esters, for example diesters of aliphatic or cycloaliphatic diols having preferably two to 10, particularly two to six, carbon atoms, such as ethylene glycol, propylene glycol, butanediol-1,4, hexanediol-1,6 and cyclohexanediol-1,4 and of monoethylenically unsaturated monocarboxylic acids having three to five carbon atoms, particularly acrylic and methacrylic acids, e.g., ethylene glycol diacrylate and ethylene glycol methacrylate, butanediol-1,4 diacrylate, butanediol-1,4 dimethacrylate, butanediol-1,4 dicrotonate, hexanediol-1,6 diacrylate and cyclohexanediol-1,4 diacrylate, polyvalent vinyl esters of polycarboxylic acids, in particular divinyl esters of aliphatic or aromatic dicarboxylic acids preferably having four to eight carbon atoms and optionally one olefinic double bond, such as divinyl oxalate, divinyl maleate, divinyl fumarate, divinyl adipate and divinyl phthalate; vinyl esters of monoolefinically α,β-unsaturated monocarboxylic acids containing preferably three or four carbon atoms, such as vinyl methacrylate, vinyl crotonate and preferably vinyl acrylate, allyl carboxylic esters, particularly of saturated or monoolefinically unsaturated dicarboxylic acids containing three to eight carbon atoms, such as diallyl phthalate, allyl acrylate, allyl methacrylate, diallyl maleate, diallyl oxalate, diallyl adipate, allyl-α-chloroacrylate and allyl-α-bromo-methacrylate. Such unsaturated carboxylic esters usually have two to three olefinic double bonds and five to 20, in particular five to 14, carbon atoms and may, if desired, be derived from substituted carboxylic acids, such as halocarboxylic acids, particularly monoolefinically unsaturated monocarboxylic acids substituted in the α-position by bromine or chlorine atoms.

Other suitable polyolefinically unsaturated monomers are polyolefinically unsaturated carboxylic amides, such as diamides derived from acrylic or methacrylic acid and diamines, particularly aliphatic diamines having two to six carbon atoms, such as N,N-ethylenebisacrylamide, N,N-ethylenebismethacrylamide and N,N-hexamethylenebisacrylamide, as well as polyolefinically unsaturated derivatives of melamine, dicyanodiamine, urea or guanidine, such as N,N-diallyl melamine, triallyl isocyanurate, tetramethylolacetylenediurea tetraallyl ether, N,N-hexamethylenebisallyluretane and N,N-xylylenebisallylurethane.

Further suitable polyolefinically unsaturated compounds are polyolefinically unsaturated amines, such as N,N-diallylamine and polyolefinically unsaturated heterocyclic compounds, such as 2,5-divinylpyridine, 1,3-divinylimidazole and 1,3-divinylcarbazole.

Polyolefinically unsaturated monomers of particular interest which can be polymerized with redox catalysts are those having the general formula $$X-R-Y$$

where X and Y are vinyl, ally, acryloyl or methacryloyl radicals which may be identical or different, and R is —O—, —NH—, a bivalent radical of an aliphatic or aromatic dicarboxylic acid having four to eight carbon atoms, a bivalent radical of a glycol having two to 10 carbon atoms or a bivalent radical of an aliphatic diamine having two to six carbon atoms.

Suitable polyolefinically unsaturated monomers containing at least two polymerizable double bonds are the so-called unsaturated polyesters such as are usually used for the manufacture of so-called unsaturated polyester resins and are described, for example, in the book by P. Selden, "Glasfaserverstärkte Kunststoffe," Springer-Verlag, 1967, pages 8 to 18. In general they have chain molecules with recurring ester groups in the chain, at least two polymerizable olefinic double bonds and molecular weights usually above 500 frequently from 500 to 5,000 or in some cases even higher, e.g., 8,000. In order to manufacture these polymers by the process described for example in the aforementioned book by P. Selden on pages 16 to 18, there are polycondensed equivalent or approximately equivalent amounts of aliphatic, cycloaliphatic or aromatic dicarboxylic acids, particularly α,β-olefinically unsaturated dicarboxylic acids usually containing four to six carbon atoms, or their anhydrides with diols, particularly with aliphatic, cycloaliphatic or aralyphatic diols generally containing two to 22, particularly two to 12, carbon atoms and, if desired, ether oxygen atoms. The unsaturated polyesters may also contain minor amounts, e.g., 0.1 to 20 percent by weight, of units of mono-, tri- or polyvalent carboxylic acids and/or mono-, tri- or polyhydric alcohols. The acid numbers of the suitable unsaturated polyesters are generally between 5 and 100, preferably between 20 and 60.

Examples of suitable polyesters are those derived from alkanediols, such as ethylene glycol, propylene glycol, butanediol-1,4; alkenediols, such as 2-butene-1,4-diol, 3-butene-1,2-diol; alkanediols containing ether oxygen atoms, such as diethylene glycol and triethylene glycol and/or neopentyl glycol; and α,β-olefinically unsaturated dicarboxylic acids, particularly maleic acid, as well as fumaric acid, itaconic acid, mesaconic acid, citraconic acid, dihydromuconic acid, α-methyleneglutaric acid and endomethylenetetrahydrophthalic acid. Such unsaturated dicarboxylic acids are advantageously used in admixture with for example 25 to 75 percent by weight, based on total dicarboxylic acid content, of dicarboxylic acids which do not contain copolymerizable double bonds, such as phthalic acid, dihydrophthalic acid, tetrahydrophthalic acid and adipic acid, in the manufacture of the unsaturated polyesters.

The amount of unsaturated polyesters may in general be between 2 and 100 percent, preferably between 5 and 40 percent, based on the total weight of monomers. In addition to the unsaturated polyesters other monomers having at least two double bonds may be used in any desired amounts. It is advantageous, however, for at least 5 percent by weight of the total weight of monomers containing at least two polymerizable double bonds to be unsaturated polyesters.

When the polyethylenically unsaturated monomers are unsaturated polyesters, polymers having a fibrous structure, i.e., poromeric materials, are obtained which have very high fastness to rubbing and tensile strength.

In carrying out the new process the first step is usually to prepare solutions, emulsions or dispersions of the monomers in water. The amount of monomer in these solutions, emulsions or dispersion may be varied within wide limits. It is generally from 1 to 30 percent, preferably from 2 to 15 percent, by weight based on the weight of the aqueous liquid containing the monomers.

If emulsions or dispersions of the monomers are employed, they may be prepared with the aid of conventional emulsifying agents and, if desired, protective colloids. Emulsifying agents which may be used are described in detail in Houben-Weyl, "Methoden der organischen Chemie," Vol. XIV/1, Makromolekulare Stoffe, Georg Thieme Verlag, Stuttgart, 1961, particularly pages 192–208. Suitable emulsifiers are for example anionic emulsifying agents, such as the alkali metal salts of fatty acids, the alkali metal salts of acid fatty alcohol-sulfuric acid esters, particularly sodium sulfonates alkali metal salts and ammonium salts of alkyl and alkylaryl sulfonic acids, salts of fatty acid condensation products with oxyalkylcarboxylic acids, aminoalkylcarboxylic acids and in particular alkali salts of sulfonated ethylene adducts of fatty alcohols or alkyl phenols containing for example five to 30, in particular eight to 20, ethylene oxide radicals, as well as cationic emulsifying agents, such as salts of alkylamines, arylamines, alkylarylamines or resin amines and salts of quaternary ammonium compounds, such as N-dodecyl-N-trimethylammonium chloride. Nonionic emulsifying agents may also be used, for example the reaction products of alkylene oxides, in particular ethylene oxide, with fatty alcohols, fatty acids or alkyl phenyl in which the alkyl groups contain preferably eight to 12 carbon atoms. In the process of the invention mixtures of emulsifying agents, for example mixtures of nonionic and anionic emulsifying agents, may also be used. The amount of emulsifying agent of the said type is generally from 0.1 to 10 percent, preferably from 0.1 to 5 percent, by weight based on the total monomer content. In special cases the addition of an emulsifying agent may be unnecessary.

If polymeric, in particular high polymeric plastics materials are added in the form of solutions or dispersions to the solutions, emulsions and/or dispersions of the monomers, in many cases the use of polyolefinically unsaturated monomers can be dispersed with. How much polyolefinically unsaturated monomers are necessary can be determined by simple preliminary experiment.

Suitable high polymeric plastics which usually have molecular weights above 10,000 are all synthetic high polymers which can be prepared by conventional polymerization and polycondensation methods, provided that they are soluble or dispersible in water or that they are present in the form of solutions or dispersions obtained in their manufacture. Examples of suitable polymers are homopolymers and/or copolymers of monoand/or diolefinically unsaturated monomers, e.g., of mono- or diolefins containing preferably two to five carbon atoms, such as ethylene, propylene, isobutylene, butadiene, chloroprene and isoprene, of $\alpha,\beta$-ethylenically unsaturated mono- and dicarboxylic acids, particularly those containing three to five carbon atoms, such as acrylic acid, methacrylic acid, maleic acid and itaconic acid and/or their optionally substituted amides, nitriles and/or esters, in particular alkanols containing one to eight carbon atoms, such as the methyl, ethyl, propyl, n-butyl, tert-butyl, n-hexyl and 2-ethylhexyl esters of acrylic and methacrylic acids and diethyl and di-n-butyl maleates, acrylamide, methacrylamide and N-n-butoxymethyl acrylamide, acrylonitrile, methacrylonitrile, of vinylaromatic monomers, such as styrene, $\alpha$-methylstyrene, divinylbenzene and vinyl toluenes containing in general only one benzene nucleus, of vinyl esters of monocarboxylic acids containing, in general, two to 12 carbon atoms, particularly vinyl acetate, vinyl propionate, vinyl butyrate and vinyl laurate, of vinyl halides, in particular vinyl chloride, vinylidene chloride and vinyl fluoride, of vinyl ethers, particularly alkanols containing one to four carbon atoms, such as vinyl methyl ether and vinyl isobutyl ether, of heterocyclic vinyl compounds, such as vinylpyridines, N-vinylpyrrolidone and N-vinylimidazolium salts, such as N-vinyl-N-methylimidazolium chloride and N-vinyl-N-methylimidazolium methosulfate. Other suitable high polymeric plastics are for example saturated linear polyesters prepared by conventional methods and having recurring carboxylic ester groups in the main chain, in particular polyethyleneglycol terephthalate, polyurethanes, especially the polycondensation products of hexamethylene diisocyanate and alkanediols containing two to six carbon atoms, such as glycol and hexanediol-1,6, synthetic linear polyamides with recurring units having the general formula —CONH— in the chain molecules, such as poly-ε-caprolactam, polylaurolactam and polycondensation products of aliphatic dicarboxylic acids, such as adipic acid or suberic acid, and of aliphatic diamines, such as hexamethylene diamine, decamethylene diamine and 4,4'diamino-dicyclohexylmethane, polyvinyl alcohols and their modified products, poly-1,2-alkylene oxides, in particular polyethylene oxides and poly-1,2-propylene oxides, polyacetals, such as polyformaldehyde, polycarbonates, polyureas, cellulose esters and ethers, in particular cellulose acetate, and polyimines such as polyethyleneimine.

The polymers and polycondensates of the said types may be prepared in a conventional manner and dispersed or dissolved in water. Solution or emulsion polymers may be used with advantage, for example in the form of solutions or dispersions obtained in their preparation. Alternatively, dispersions may be used which are prepared from the polymers or polycondensates, e.g., polyethylene, synthetic polyamides, polyalkylene oxides, or polyformaldehyde. In the preparation of polymer dispersions by emulsion polymerization or so-called secondary dispersions conventional emulsifying agents and protective colloids may be used. Examples of suitable emulsifying agents are listed above.

Of particular interest are aqueous polymer dispersions which are used as such as binders, particularly as binders for nonwoven fabrics. Particularly advantageous aqueous dispersions are those based on homopolymers and copolymers of acrylic and methacrylic acid derivatives, such as esters of acrylic and/or methacrylic acid with alkanols having one to eight, particularly one to four, carbon atoms, with cycloalkanols having five or six carbon atoms in the ring, or with polyhydric, particularly dihydric or trihydric, alcohols having two to six carbon atoms; of acrylic and/or methacrylic amides or their N-methylol compounds or their N-methylol ethers of alcohols having one to four carbon atoms; and of acrylic and/or methacrylic acid. Suitable homopolymers and/or copolymers are for example the methyl, ethyl, n-propyl, n-butyl, isobutyl, n-hexyl, 2-ethylhexyl and cyclohexyl esters of acrylic and methacrylic acids, 2-hydroxyethyl acrylate, 1,4-butanediol monoacrylate, 3-chloro-2-hydroxypropyl acrylate, acrylamide, methacrylamide, N-methylolacrylamide, N-methylolmethacrylamide, N-methylolacrylamide methyl ether and N-methylolmethacrylamide n-butyl ether. Moreover, aqueous polymer dispersions based on copolymers with other conventional comonomers, such as styrene, containing at least 40 percent by weight of units of the said acrylic or methacrylic derivatives are advantageous. Aqueous polymer dispersions based on copolymers of butadiene or vinyl esters, in particular carboxylic acids containing two to four carbon atoms, are also advantageous.

Aqueous solutions and dispersions of homopolymers and copolymers of vinyl chloride, homopolymers and copolymers of styrene, polyisobutylene, synthetic polyamides, polyurethanes and polyvinylpyrrolidone are also of interest.

The amount of high polymeric plastics of the said type in the monomer solutions, emulsions or dispersions may be varied within wide limits. In general it is from 0.1 to 50 percent, preferably from 1 to 30 percent, by weight based on the total weight of the solution, emulsion or dispersion containing the monomers and plastics. The weight ratio of the monomers to plastics is generally 0.5 to 10:1, advantageously 3 to 8:1.

Where polymeric plastics are used in the form of a solution or dispersion, the values given for the monomer concentrations in the mixtures of monomers, solvents and plastics are based on the total weight of the mixture.

The redox catalysts used may be any of the redox catalysts conventionally employed in the polymerization of olefinically unsaturated monomers. They are usually composed of an oxidizing substance and a reducing substance. Examples of suitable redox catalyst systems are given in detail for example in Houben-Weyl, "Methoden der organischen Chemie," Vol. XIV/1 Makromolekulare Stoffe, Georg Thieme Verlag, Stuttgart, 1961, see in particular pages 263–297. Suitable oxidizing components are for example molecular oxygen, hydrogen peroxide, organic peroxides, such as cumene hydroperoxide, t-butyl hydroperoxide, tetrahydronaphthalene hydroperoxide and dibenzoyl peroxide, potassium peroxide disulfate and ammonium peroxide disulfate, chlorine, hypochlorous acid and its salts, as well as salts of chloric, bromic and iodic acids and ceric sulfate, potassium permanganate and salts of chromic acid. Examples of suitable reducing components are sulfur compound having a reducing action, such as sulfur dioxide, sulfites, hydrogen sulfite, disulfites, dithionites, thiosulfates, sulfoxylates and hydrogen sulfide and its salts, nitrogen compounds with a reducing action, such as hydroxylamine, hydrazine and its derivatives, amines, such as dimethylaniline, trimethylamine and triethanolamine, sodium hydrophosphite, and organic compounds with a reducing action, such as glucose, and reductones, such as ascorbic acid and dihydroxymaleic acid, organic sulfinic acids, hydrogen sulfite adducts, long-chain aliphatic mercaptans as well as compounds of polyvalent metals in their lower valency forms, e.g., those of iron(II), copper(I) and cobalt(II). The combination of ammonium or alkali persulfates or hydrogen peroxide with iron(II) or copper(I) salts has proved to be particularly advantageous.

The amount of oxidizing component is generally between 0.01 and 10 percent, preferably between 0.1 and 2 percent, by weight based on the monomer content. The reducing agent is generally added in bulk or in solution or, in special cases, in the form of an emulsion or dispersion. The amount of reducing component is generally between 0.01 and 20 percent, preferably between 0.1 and 5 percent, by weight based on the monomer content.

It is usually advantageous to prepare a solution, emulsion or dispersion of the reducing component of the catalyst together with the monomers and, after having caused the solution, emulsion or dispersion to undergo complete or partial crystalline solidification, to treat the said solution, emulsion or dispersion with the oxidizing components.

In some cases, however, particularly when the polymerization is to take place in a thin layer, it is possible to apply the reducing and oxidizing catalyst components either separately or as a mixture to the impregnated, "frozen" web of fibrous material.

The webs of fibrous material are impregnated with the solutions, emulsions or dispersions of monomers optionally containing plastics for example by passing them through the liquids containing the monomers, by placing then in tanks containing the said liquids or by spraying them with the said liquids. Particularly suitable webs of fibrous material are nonwoven fabrics of natural or synthetic fibers which may be needled in a conventional manner. Woven or knitted fabrics of natural or synthetic fibers which have preferably been markedly teased are also suitable. Wool, cellulosic, cellulose acetate, viscose, polypropylene, polyamide, such as polycaprolactam, polyhexamethylene adipamide and polyhexamethylene sebacamide, polyacrylonitrile and/or polyethylene terephthalate may for example be used.

Impregnation of the webs of fibrous material is preferably carried out in such a way that 50 to 500 parts by weight of monomers (including the high polymeric plastics, if used) are used per 100 parts by weight of fibrous material.

The webs of fibrous material impregnated with the solutions or emulsions are subjected to conditions under which the solvents undergo complete or partial crystalline solidification, this being usually achieved by cooling. By "partial crystalline solidification" we mean the partial solidification of the liquid in crystalline form and not the crystallization of the monomers out of the solution or emulsion without the simultaneous separation of solvent crystals. Freezing may be effected for example on a cold surface, such as a cooled endless belt or a cooling roller. Cooling is generally carried to such a degree that more than 50 percent, preferably more than 60 percent, by weight of the monomer solution, emulsion and/or dispersion undergoes crystalline solidification.

In a special embodiment of the process cooling may be carried out between two cooled endless metal belts or two cooling rollers or with particular advantage in a cooling gap. The distance between the cooling surfaces, for example the distance between the cooling belts or the cooling rollers or the width of the cooling gap, is generally less than 5 cm. In some cases it may be an advantage to use a distance between the cooling surfaces of more than 5 cm. Usually, however, the cooling surfaces are 0.5 to 10 mm., particularly 1 to 5 mm., apart. Preferably the cooling surfaces have poor wetting properties, particularly when two or more cooling rollers or cooling gaps are used. When cooling gaps are employed, their length may be varied within wide limits.

During the cooling operation the material impregnated with the solution or emulsion is in the form of a flat structure, usually in the form of wide continuous webs having a width generally from 0.1 to 3 m. and a thickness generally from 0.5 to 20 mm., preferably from 1 to 10 mm.

The web containing the completely or partially frozen solutions, emulsions or dispersions is then treated with the redox catalyst or, if it already contains one component of the catalyst, it is treated with the other component. This may be carried out for example by spraying, gassing, immersion or pouring on a solution of the redox catalyst or a component thereof.

Monomer conversion in the polymerization is usually from 20 to 90 percent or more. After polymerization the solvents and any residual monomers are separated from the resulting poromeric materials. This may be achieved for example by heating the reaction products to melt the crystalline solvents which may then be removed by filtration, centrifuging and/or evaporation. Removal of the solvents may also be effected under reduced pressure.

In prior art processes for the manufacture of polymers from monomers containing at least two polymerizable double bonds, in general extremely brittle materials which were of a glassy nature and readily disintegrated or which were in powder form were obtained unless considerable quantities of monoethylenically unsaturated monomers were added. Such polymers have been used as ion exchangers for example. It was not possible to produce fibers from such polymers. By contrast, the process of the present invention enables polymers to be obtained directly in the form of fibers from any monomer or monomer mixture provided it contains at least 0.01 percent by weight of monomers having at least two polymerizable double bonds. The resulting fibrous polymers form, together with the fibrous carrier material, for example a nonwoven fabric, a porous flat fibrous web of a velvety or leathery nature, which we call "poromeric material," by which we mean material which "breathes" and exhibits capillary action, i.e., material which is permeable to water vapor and air. Such products may be obtained in various colors when "colored monomers" are used in the process.

The products of the process of the invention may be used for example as floor coverings, thermal insulating materials, particularly at high temperatures, leather substitutes and coating materials. If monomer mixtures containing a high proportion of monomers having at least two polymerizable double bonds, for example more than 50 percent by weight based on the total monomer content, are used, fibrous polymers having particularly good thermal stability are obtained.

Poromeric materials with particularly good fastness to rubbing are obtained by the process of the invention, for example when the nonwoven textile fabric impregnated with monomer solutions or emulsions and in the form of a flat structure is cooled on both sides and or the polyolefinically unsaturated monomers used alone or in admixture are unsaturated polyesters and/or high polymeric plastics in solution or dispersion are used in addition to the monomer solutions or emulsions.

The invention is further illustrated by the following examples in which parts and percentages are by weight. The acid numbers given were measured according to DIN 53,402. The yield are indicated as a percentage of the increase in weight of the nonwoven fabric after treatment with reference to the original weight of the monomers and any high polymeric plastics used.

EXAMPLES 1 to 6

The unsaturated compounds and the reducing component of the redox catalyst given in Table 1 are dissolved or emulsified in 600 parts of water and, in some cases, a polymer dispersion as specified in Table 1 is added. These mixtures are used to impregnate nonwoven fabrics of cellulosic fibers (weight 150 g./m.$^2$), and the impregnated fabrics are cooled to −30° C. on a cold surface. When the web of material has solidified, the oxidizing component of the redox catalyst system, as given in the table, is sprayed on in the form of a solution in 10 parts of water and allowed to act for half an hour at −10° C. The resulting products are then washed with water and dried in the air.

Poromeric materials are obtained which have a soft, leathery handle, good water absorption and excellent thermal and sound insulating properties.

TABLE 1

| Ex. | Parts | Monomers | Parts | Redox catalyst | Parts | Additives | Yield in percent |
|---|---|---|---|---|---|---|---|
| 1 | 5 | bis-N-methylolacrylamide ethylene glycol ether | 0.7 | Ammonium persulfate | | | 32 |
|   | 24 | 3-chloro-2-hydroxypropyl acetate | 0.35 | Iron (II) sulfate | | | |
| 2 | 10 | Butanediol diacrylate | 4.5 | H$_2$O$_2$ (30%) | 0.7 | Sulfonated castor oil | 92 |
|   | 25 | Butanediol monoacrylate | 0.7 | Iron (II) sulfate | | | |
| 3 | 10 | Butanediol diacrylate | 4.5 | H$_2$O$_2$ (30%) | 0.7 | do | 49 |
|   | 25 | Butanediol monoacrylate | 0.7 | Ascorbic acid | | | |
| 4 | 1 | Allyl acrylate | 4.5 | H$_2$O$_2$ (30%) | 0.7 | do | 40 |
|   | 28 | Ethyl acrylate | 0.7 | Copper (I) chloride | 15 | 40% polymer dispersion of 85% butyl acrylate, 3% butanediol diacrylate, 5% N-methylolacrylamide and 7% acrylic | |

Table I—Continued

| Ex. | Parts | Monomers | Parts | Redox catalyst | Parts | Additives | Yield in percent |
|---|---|---|---|---|---|---|---|
| 5 | | as in Example 4 | 3<br>1.4 | H₂O₂ (30%)<br>Iron (II) sulfate (dissolved in 15 parts of water). | | as in Example 4 | 40 |
| 6 | 29 | Isopropyl acrylate | 4.5<br>0.7 | H₂O₂ (30%)<br>Iron (II) sulfate | 0.35<br>15 | Sulfonated castor oil<br>50% dispersion of 60 parts copolymer of vinyl chloride (80%) and methyl acrylate (20%), plasticized with 40 parts of the phthalic ester of 2-ethylhexanol. | 83 |

EXAMPLES 7 to 14

The monomers, aqueous polymer dispersions, where used, and the reducing components of the redox catalyst systems in the quantities given in Table 2 are dissolved, emulsified or dispersed in water together with 1.7 parts of sulfonated castor oil as emulsifying and wetting agent. These mixtures are used to impregnate pieces of nonwoven fabric measuring 40×30 cm. and of the type and weight given in Table 2. The impregnated fabrics are cooled to −30° C. on a cold surface. After solidification of the webs of material, the oxidizing component of the catalyst, dissolved in 30 parts of water, is sprayed on and allowed to act for half an hour at −10° C. The resulting products are then washed in water and dried in the air.

As in Examples 1 to 6, poromeric materials are obtained which have a soft, leathery handle, good water absorption and excellent thermal and sound insulating properties.

TABLE 2

| Ex. | Parts water | Parts | Monomers | Parts | High polymeric plastics | Parts | Redox catalyst components | Nonwoven fabric of g./m.² | Yield in Percent |
|---|---|---|---|---|---|---|---|---|---|
| 7 | 600 | 35<br>2<br>2 | 2-ethylhexyl acrylate<br>Methacrylamide<br>1,6-hexanediol divinyl ether. | 25 | Stryene/n-butyl acrylate copolymer (50:50) as 40% dispersion. | 1.5<br>0.5 | H₂O₂<br>FeSO₄ | Spun-bonded polypropylene: 150. | 55 |
| 8 | 600 | 30 | n-Butyl acrylate | 20 | Butadiene/styrene/methacrylamide copolymer (59:39:2) as 40% dispersion. | 1.5<br>0.5 | H₂O₂<br>FeSO₄ | Needled polycaprolactam: 110. | 47 |
| 9 | 400 | 30<br>2<br>8 | Cyclohexyl acrylate<br>N-methylolacrylamide<br>Methylenebisacrylamide | | | 1.4<br>0.7 | K₂S₂O₈<br>FeSO₄ | do | 40 |
| 10 | 600 | 25<br>2<br>2 | 1,6-hexanediol monoacrylate.<br>N-methylolacrylamide methyl ether.<br>Divinyl maleate | 15 | n-Butyl acrylate/N-methylolmethacrylamide/acrylic acid copolymer (89:7:4) as 40% dispersion. | 1.5<br>0.5 | H₂O₂<br>FeSO₄ | Spun-bonded polyethylene terephthalate: 120. | 63 |
| 11 | 600 | 15<br>10<br>10 | n-Butylacrylate<br>Vinyl isobutylether<br>Polyester derived from 1 mole phthalic anhydride, 2 moles maleic anhydride and 3 moles propylene glycol-1,2. | | | 1.5<br>0.5 | H₂O₂<br>FeSO₄ | do | 40 |
| 12 | 600 | 10<br>28 | Ethylene glycol diacrylate<br>1,4-butanediol monoacrylate | | | 1.5<br>0.5 | H₂O₂<br>CuCl | do | 42 |
| 13 | 600 | 25 | 1,4-butanediol diacrylate | 25 | Styrene/n-butyl acrylate/N-methylolmethacrylamide copolymer (50:45:5) as 40% dispersion. | 1.5<br>0.5 | H₂O₂<br>FeSO₄ | Spun-bonded polycaprolactum: 120. | 63 |
| 14 | 600 | 35 | 1,6-hexanediol diacrylate | | | 1.5<br>0.5 | H₂O₂<br>FeSO₄ | do | 49 |

We claim:

1. A process for the manufacture of poromeric materials which comprises impregnating webs of fibrous material with aqueous liquids containing A. polyolefinically unsaturated monomers which can be polymerized with redox catalysts, in an amount of from 1 to 30 percent by weight based on the aqueous liquid, or
   B. polyolefinically and monoolefinically unsaturated monomers which can be polymerized with redox catalysts, in a total amount of from 1 to 30 percent by weight based on the aqueous liquid, in dissolved, emulsified or dispersed form, cooling the webs of fibrous material impregnated with the said aqueous liquids to temperature at which the liquids undergo at least partial solidification, polymerizing the unsaturated monomers using redox catalysts, at least one component of which is not added until after the said liquids have undergone partial or complete crystalline solidification, thawing out and separating the water and any residual unsaturated monomer, from the resulting poromeric materials.

2. A process as in claim 1 wherein the aqueous liquids additionally contain

C. high polymeric plastics which are dispersible or soluble in water, in an amount of from 0.1 to 50 percent by weight based on the aqueous liquid.

3. A process for the manufacture of poromeric materials which comprises impregnating webs of fibrous material with aqueous liquids containing monoolefinically unsaturated monomers which can be polymerized with redox catalysts, in an amount of from 0.1 to 30 percent by weight based on the aqueous liquid, and high polymeric plastics which are dispersible or soluble in water, in an amount of from 0.1 to 50 percent by weight based on the aqueous liquid in dissolved, emulsified or dispersed form, cooling the webs of fibrous material impregnated with the said aqueous liquids to temperatures at which the said liquids undergo at least partial solidification, polymerizing the unsaturated monomers using redox catalysts, at least one component of which is not added until after the said liquids have undergone complete or partial crystalline solidification, thawing out and separating the water and any residual unsaturated monomers from the resulting poromeric materials.

4. A process as in claim 1 wherein the monoolefinically unsaturated monomers are acrylic or methacrylic esters of alcohols having one to eight carbon atoms, acrylamides or methacrylamides.

5. A process as in claim 1 wherein the polyolefinically unsaturated monomers are those having the general formula

X—R—Y where X and Y are vinyl, allyl, acryloyl or methacryloyl radicals and R is —O—, —NH—, a bivalent radical of an aliphatic or aromatic dicarboxylic acid having four to eight carbon atoms, a bivalent radical of a glycol having two to 10 carbon atoms or a bivalent radical of an aliphatic diamine having two to six carbon atoms.

6. A process as in claim 1 wherein the high polymeric plastics are in aqueous dispersion and are selected from the group consisting of homopolymers and copolymers of acrylic esters of alcohols having one to eight carbon atoms, of methacrylic esters of alcohols having one to eight carbon atoms, of acrylamides, of methacrylamides and of mixtures of said homopolymers and copolymers.

7. A process as in claim 3 wherein the monomers are acrylic or methacrylic esters of alcohols having one to eight carbon atoms, acrylamides or methacrylamides.

8. A process as in claim 3 wherein the high polymeric plastics are in aqueous dispersion and are selected from the group consisting of homopolymers and copolymers of acrylic esters of alcohols having one to eight carbon atoms, of methacrylic esters of alcohols having one to eight carbon atoms, of acrylamides, of methacrylamides and of mixtures of said homopolymers and copolymers.

9. A process as in claim 1 wherein said impregnated web is in the form of a flat structure having a thickness of about 0.5 to 20 mm.

* * * * *